May 18, 1948.  W. W. PAGET  2,441,592
PRESSURE CONTROLLING APPARATUS
Filed Aug. 6, 1942  4 Sheets-Sheet 1

Inventor:
Wm W. Paget.

May 18, 1948. W. W. PAGET 2,441,592
PRESSURE CONTROLLING APPARATUS
Filed Aug. 6, 1942 4 Sheets-Sheet 2
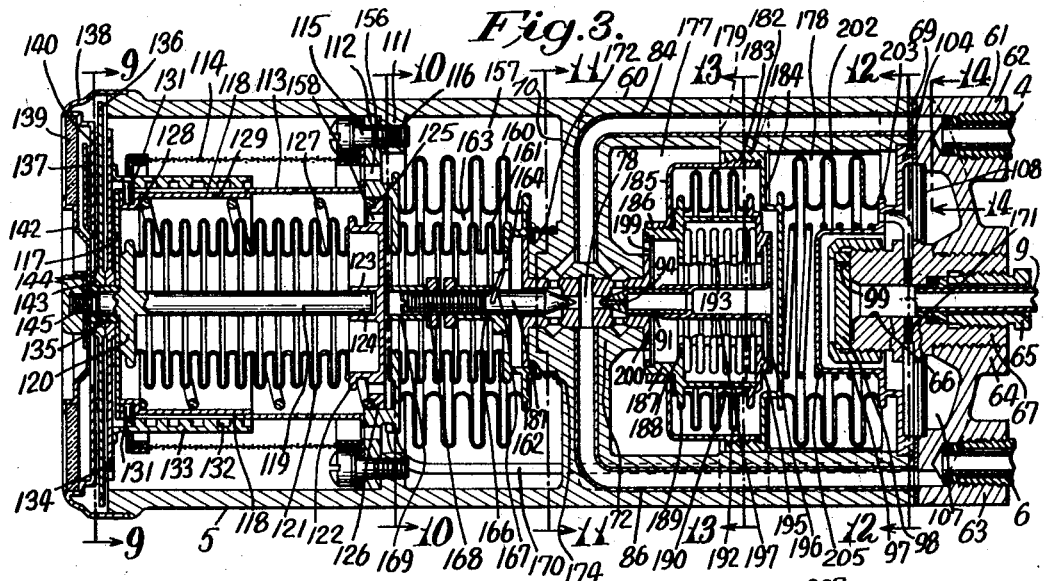
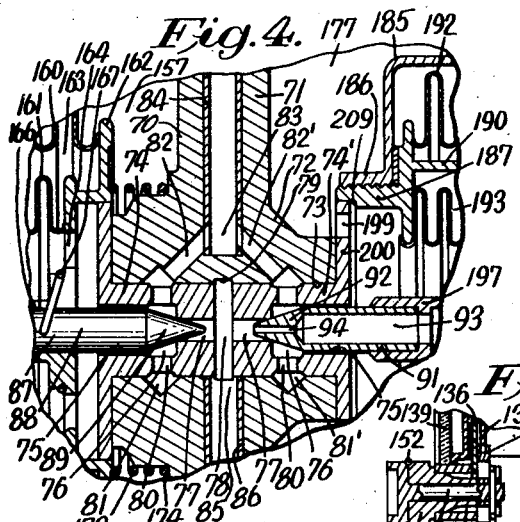
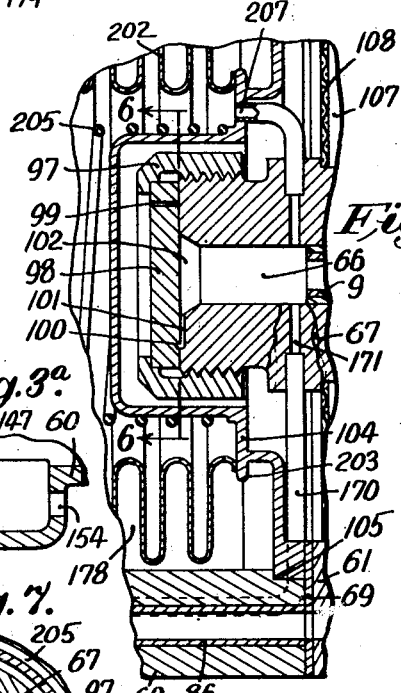
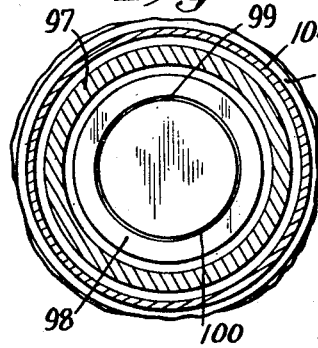
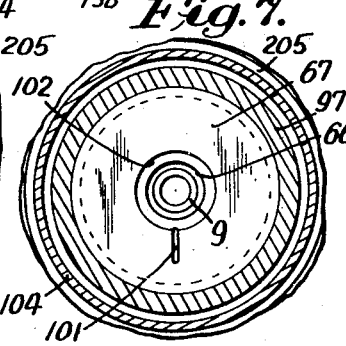
Inventor:
Win W. Paget.
by
Lewis A. Maxom
atty.

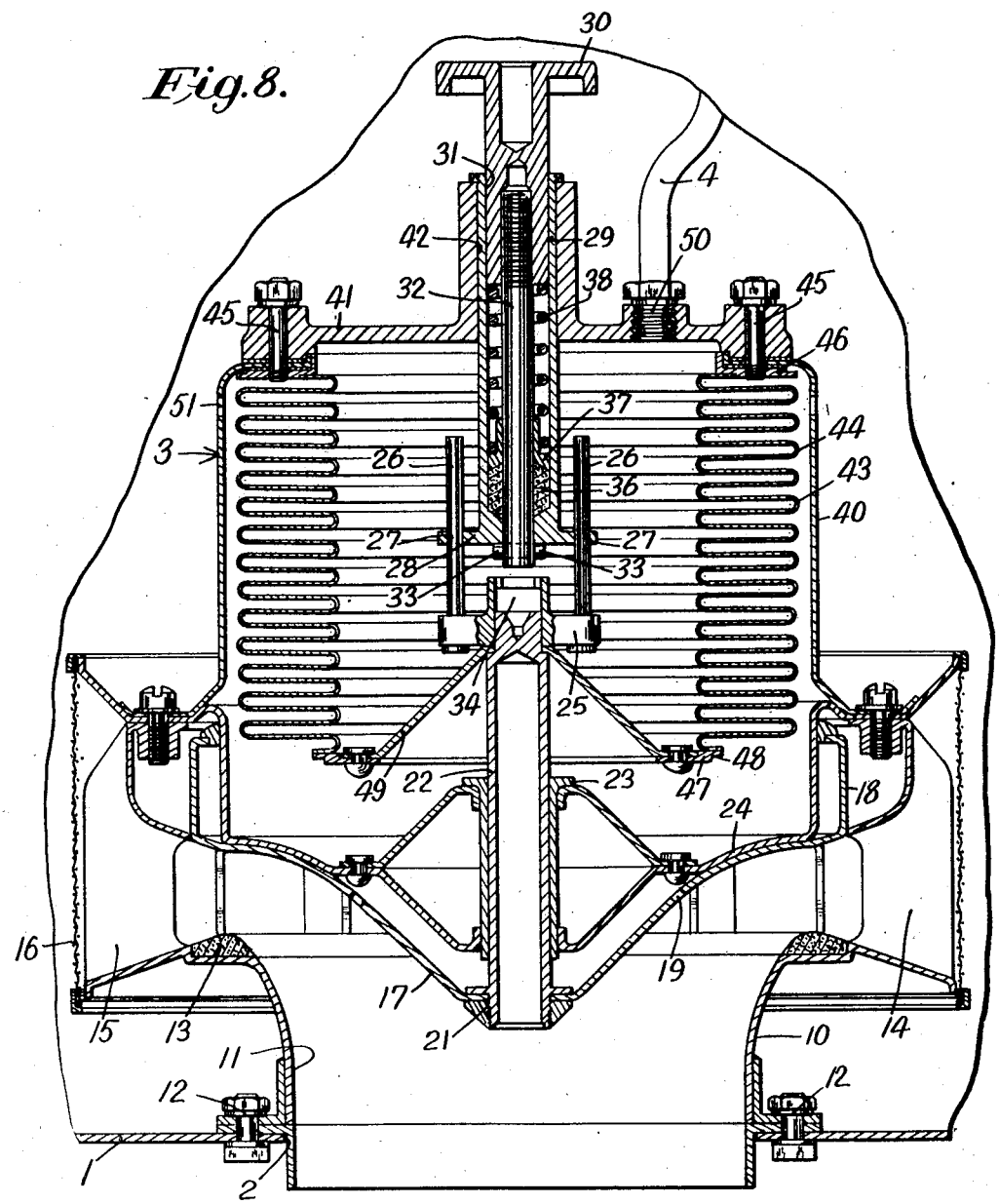

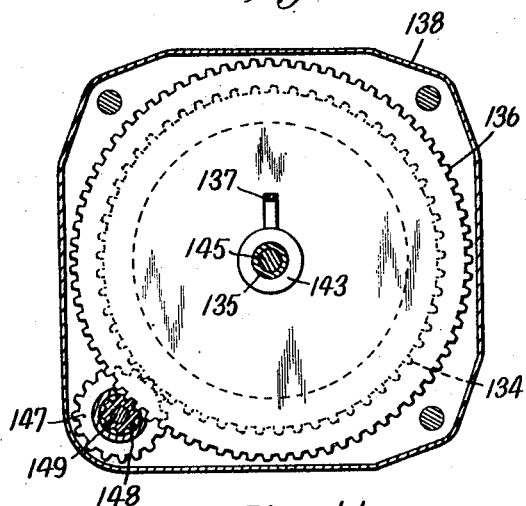
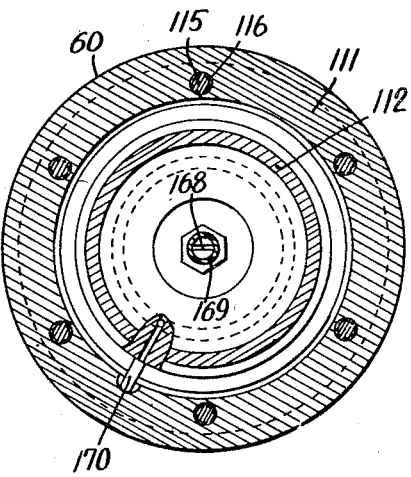
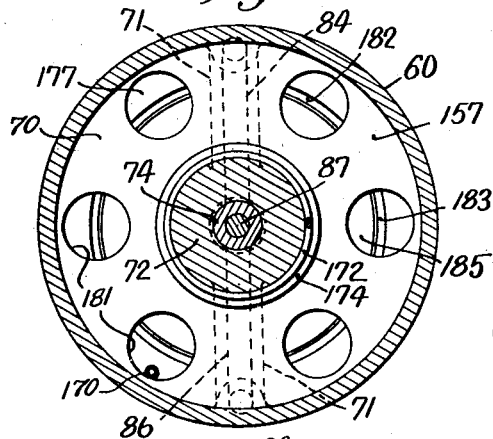
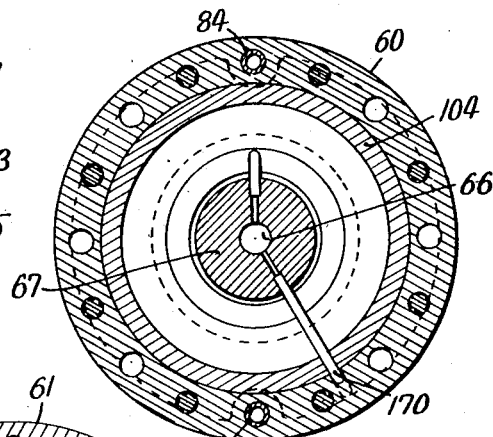
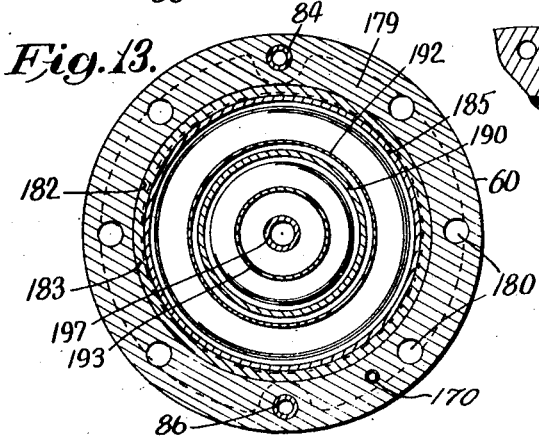

Patented May 18, 1948

2,441,592

UNITED STATES PATENT OFFICE 2,441,592

PRESSURE CONTROLLING APPARATUS

Win W. Paget, Michigan City, Ind., assignor to Joy Manufacturing Company, a corporation of Pennsylvania Application August 6, 1942, Serial No. 453,860

36 Claims. (Cl. 98—1.5)

My invention relates to pressure controlling apparatus, and more particularly to apparatus for controlling the pressure in the cabin of an aircraft, such as an airplane.

Flight at high altitudes is practically possible only with enclosed cabins in which the pressure is artificially maintained at values above the values which subsist outside the cabin. In order that the cabin pressure can be maintained, it is customary to provide devices for pumping air from outside of the cabin into the cabin, and since a sufficiently close regulation of the pumping apparatus to maintain desired pressure conditions is impossible, automatically controlled outflow valves are necessary.

It is possible to permit the pressure in the cabin to drop substantially in the same way that external pressure falls off with increasing height, up until certain heights are reached, such as, for example, 8,000 feet, but in a very fast climbing plane it is preferred not to allow the cabin pressure to reduce as rapidly as the reduction in external pressure occurs—this for the greater comfort of the cabin occupants. It is further important, or at least highly desirable, that from a height of the order of 8,000 feet to some very considerably higher altitude, such as, perhaps, 35,000 feet, the cabin pressure be caused to remain approximately at that value which corresponds to the selected lower altitude, for example 8,000 feet. It is also desirable that above the higher selected limit, e. g. 35,000 feet, there be a progressive reduction in cabin pressure as the plane goes still higher, this in order that there may be less power required for the purpose of pumping air and that the range of compression may be kept reasonable.

It is further desirable that means be provided to enable an adjustment of the cabin pressure at will to increase the pressure above that which normally exists at the altitudes of sustained flight. For example, if an aircraft is going to land at an airport which is at a considerable elevation, say 4,000 feet, and it is necessary for it, in order to approach the airport from the direction in which it is coming, to pass over a range of considerable height just before the port is reached, it is either necessary for the plane to make a considerable flight beyond the designed point of landing, in order that an unpleasantly rapid increase in cabin pressure may not be encountered, or else that the plane be provided with means whereby the cabin pressure may be raised over a considerable period in advance of arrival at the port, this latter expedient involving both the provision of an adjustment for increasing the cabin pressure and also, desirably, means for limiting the rate of increase from the previously maintained pressure level to the pressure level which is selected by the adjusting means.

It is an object of my invention to provide an improved automatic pressure controlling system for airplane cabin pressures. It is another object of my invention to provide an improved automatic pressure controlled mechanism. It is a further object of my invention to provide an improved cabin pressure controlling apparatus having improved means for limiting the rates of cabin pressure changes. It is a further object of my invention to provide an improved cabin pressure control system having improved means for controlling the rates of cabin pressure changes both during increases and during decreases in cabin pressure. It is another object of my invention to provide an improved cabin pressure controlling apparatus having improved means for permitting the fall of cabin pressure during an initial rise of a predetermined amount and having improved means associated therewith whereby the rate of reduction in cabin pressure may be maintained less than the rate of diminution of the external pressure, if the rate of rise of the aircraft exceeds a predetermined one. It is still another object of my invention to provide an improved cabin pressure control system having improved means whereby the cabin pressure may be deliberately increased while the aircraft continues to operate at or above a level where the external pressure is below, or at least not in excess of, the existing cabin pressure at the moment of initiation of the increase; and it is a subsidiary object to provide an improved control whereby the rate of cabin pressure increase may be maintained within the range of comfort or within such other range as expediency may dictate. It is still another object of my invention to provide an improved cabin pressure control system incorporating improved apparatus for maintaining substantially uniform cabin pressure conditions during flight between predetermined altitudes; for automatically maintaining a predetermined ratio between cabin and external pressures when the higher one of said predetermined altitudes is exceeded; for limiting the rate of diminution of cabin pressure within predetermined limits, as, for example, to about one inch of mercury per minute; for providing for deliberate elevation of the cabin pressure when desired while still maintaining automatic control through the controlling apparatus and for automatically limiting the rate of pressure rise during such periods of deliberate cabin pressure increase to a rate suited to the comfort or needs of the cabin occupant, as, for example, by maintaining the rate of pressure increase at values not exceeding say 0.30 inch of mercury per minute. It is still another object of my invention to provide an improved automatic cabin pressure control system in which utilization is made of the relative rate of change between cabin pressure and pressure in a tank having communication with the cabin through a very small opening (the size of the opening is variable with the size of the tank, but the tank should preferably be small in view of the space requirements of aircraft designing) to govern the rate of cabin pressure change, and desirably both the rate of increase and the rate of decrease.

In a preferred embodiment of the invention there is desirably included an expansible-chamber-device-controlled, cabin-pressure vent valve and automatic controlling means for the expansible chamber device which controls said vent valve, including means for feeding pressure to said device from the cabin and venting pressure from said device to the exterior of the cabin. Desirably, a plurality of controls for the purpose of shifting the connections of such device between the exterior of the cabin and the interior thereof are provided, including an improved, adjustable expansible device, desirably in the form of an evacuated bellows having improved means associated therewith for varying the action of said bellows under cabin pressure variation and further having associated therewith an additional bellows device governed by cabin pressure and pressure in a tank having restricted communication with the cabin, in such manner as to provide a graduated rate of cabin pressure reduction during the period from takeoff to attainment of so-called pressurizing elevation, say 8,000 feet. Desirably, further, the automatic control may include an additional device responsive to the differential in pressure between the inside of the cabin and the outside thereof for causing diminishing of cabin pressure upon the exceeding of certain relatively high elevations, such control means desirably having associated therewith additional control devices governed by the differential between tank pressure and cabin pressure for limiting the rate of rise of cabin pressure when the evacuated bellows first above mentioned has its responsiveness to cabin pressure deliberately altered in a manner to cause an increase in cabin pressure. It will be understood that while the devices for controlling rates of cabin pressure change may advantageously be combined with those which automatically effect variations of cabin pressure upon predetermined changes in conditions, the use of a separate supplementary control device for this purpose is within the scope of my invention.

In the accompanying drawings in which a preferred embodiment of my invention has been shown for purposes of illustration:

Fig. 3 is a central longitudinal sectional view on the plane of the line 3—3 of Fig. 2.

Figures 1, 2:
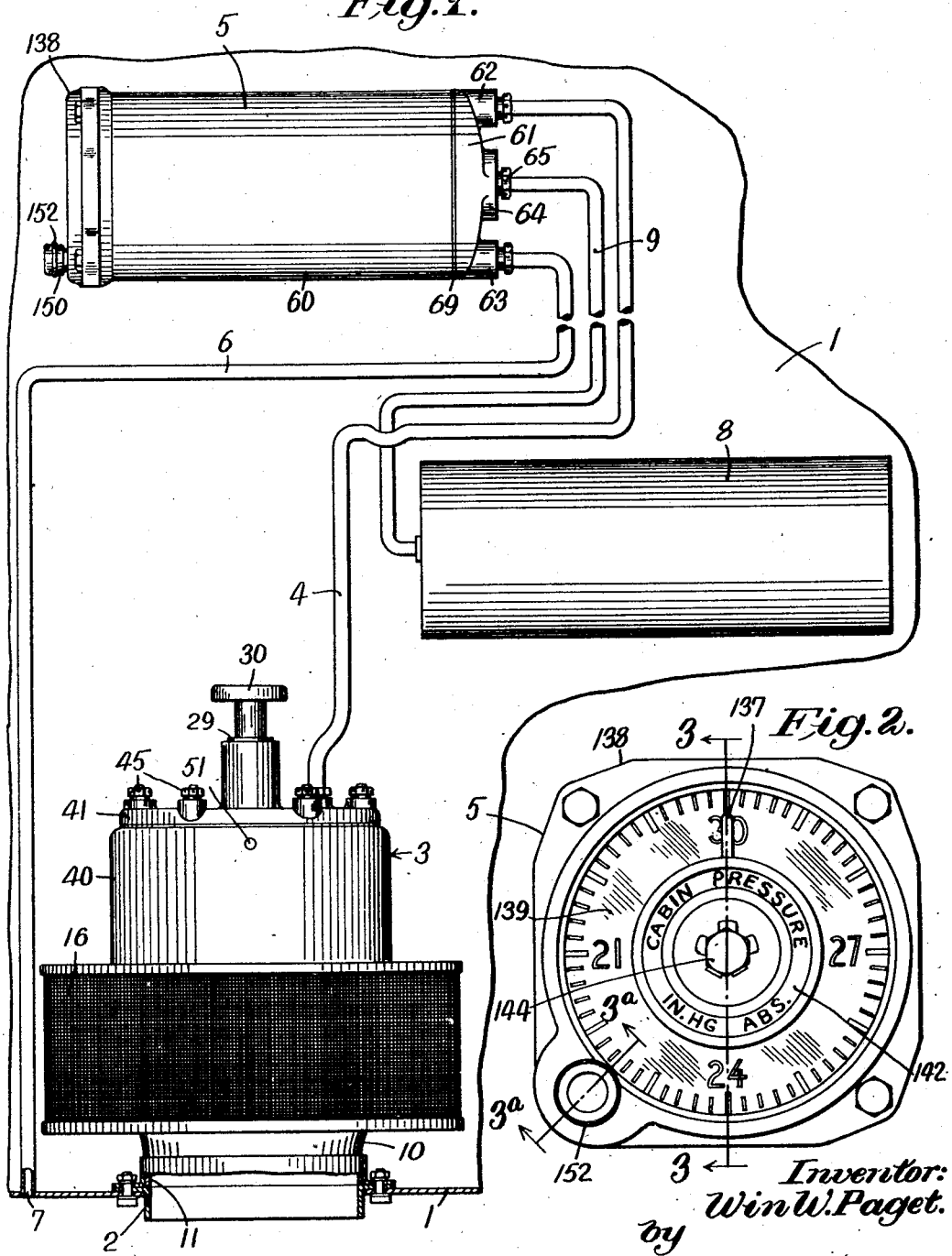
Fig. 1 is a diagrammatic view showing in elevation the cabin vent valve, the controlling mechanism and the tank hereinabove mentioned.
Fig. 2 is an enlarged end elevational view of the automatic control valve mechanism.

Fig. 3ª is a fragmentary sectional view on the plane of the line 3ª—3ª of Fig. 2.

Fig. 4 is an enlarged view of a portion of the pilot mechanisms shown in Fig. 3.

Fig. 5 is an enlarged view of a portion of the apparatus for controlling the rate of change of tank pressure, the section being taken on the same planes as Fig. 3.

Fig. 6 is a transverse section on the plane of the line 6—6 of Fig. 5, showing on a reduced scale a detail of the tank pressure control apparatus.

Fig. 7 is a sectional view on the same plane as Fig. 6, looking in the opposite direction.

Fig. 8 is an enlarged, central vertical sectional view through the expansible-chamber-device-operated cabin vent valve.

Fig. 9 is a transverse section on the plane of the line 9—9 of Fig. 3, showing a portion of the cabin pressure adjusting mechanism.

Fig. 10 is a transverse section on the plane of the line 10—10 of Fig. 3.

Fig. 11 is a transverse sectional view on the plane of the line 11—11 of Fig. 3.

Fig. 12 is a transverse section on the plane of the line 12—12 of Fig. 3.

Fig. 13 is a transverse section on the plane of the line 13—13 of Fig. 3.

Fig. 14 is a transverse section on the plane of the line 14—14 of Fig. 3.

Referring to the drawings, and first to Fig. 1, it will be noted that the wall 1 represents the wall of an airplane cabin and that this wall is perforated by an opening 2 over which there is mounted a cabin vent valve mechanism generally designated 3. The vent valve mechanism is of an expansible-chamber-device-operated type as will be later explained, and the venting off of the cabin is controlled by the transmission of cabin pressure to the mechanism 3 and by the venting of pressure to the exterior of the airplane from the mechanism 3, both through a connection 4. This connection leads to a pilot mechanism 5, which is further connected through a conduit 6 with an atmospheric vent 7 opening through the wall of the cabin. A tank 8 is connected by a conduit 9 with the pilot mechanism 5, and the rate of change of pressure within the tank is restricted, as will be later explained; and the pilot mechanism 5 is automatically operative to preclude the existence of differences in excess of certain predetermined values between cabin pressure and tank pressure, whereby the rate of change of cabin pressure may be held within at least safe and, desirably, comfortable values.

*Cabin vent valve mechanism*

The structure of the cabin vent valve mechanism is disclosed in Fig. 8, and this mechanism will be noted to comprise a casing 10 having a discharge orifice 11 and secured as at 12 to the wall 1 of the cabin around the opening 2. A valve seat of fibre or other suitable material is provided at 13; and a generally annularly arranged discharge passage 14, partially cut up into sectors by supporting flanges 15, is surrounded by a screen 16 which serves to prevent the possibility of any objects from within the cabin obtaining access into the interior of the valve mechanism and thereby interfering with its operation. The vent valve proper is designated 17 and is relatively conical at its lower end and is provided with a cylindrical portion 18 at its upper end. It is of the approximately balanced type, and is traversed by openings 19 so that the pressure at its opposite sides may be equalized. The vent valve 17 is mounted in any suitable manner, herein by means of a nut and shoulder arrangement 21 at the lower end of an operating stem 22 which is guided in a bushing 23 supported in a wall 24 of the valve casing. The valve stem 22 carries at its upper end a multi-armed support member 25 carrying guide pins 26 which traverse openings 27 in a projecting portion 28 at the lower end of a fixed hollow supporting and guiding sleeve member 29. A manually operable plunger 30 is guided in a bore 31 in the member 29, and has connected to it a push rod 32, connectible by projecting key portions 33 within a chamber 34 formed within the member 25. A packing 36 is maintained in sealing relation with the rod 32 by a follower 37 and a spring 38, which also acts against the lower end of the plunger 30 to maintain the latter normally in elevated position. It will be evident that by forcing the member 30 downward until the key portions 33 enter the chamber 34 and then partially rotating the rod 32 to effect an interlock, the valve 17 may be positively moved to free the same of ice, in case this becomes necessary, simply by manipulating the plunger 30. The top of the casing 10 carries a housing portion 40 supporting a top 41, in which there is a bore 42 in which the guide and support sleeve member 29 is mounted. An expansible chamber device 43 is enclosed within the housing 40 and comprises a bellows 44 secured in sealed relation by studs 45 and an annular end element 46 with the housing portion 40 and the top 41; and the lower end of the bellows element 44 is connected to a lower head 47 comprising a ring member 48 and a conical portion 49, the latter connecting the lower head with the stem 22. The conduit 4 is connected at 50 within an opening in the head 41. Openings 51 connect the interior of the casing 40 with cabin pressure. When cabin pressure materially exceeds the pressure within the bellows 44, the valve 17 will be opened. When the pressure within the bellows is the same as cabin pressure, the valve 17 will be closed. Means immediately to be described is provided whereby the interior of the bellows 44 may be subjected to cabin pressure and may be connected with exterior pressure, such means including, as will be explained, a plurality of pilot valves each positionable to connect the interior of the bellows with the pressure outside the cabin, the arrangement being such that either pilot valve may establish a communication with the exterior of the cabin which is effective to reduce the pressure inside the bellows 44 below cabin pressure regardless of the position of the other pilot valve.

*The pilot, controlling valve mechanism*

The pilot mechanism 5 comprises a casing 60 having a head 61 secured thereto in any appropriate manner. The head 61 has a boss 62 in which the connection 4, at its end remote from the cabin vent valve mechanism, is mounted, and a further boss 63 in which the conduit 6 leading to the exterior of the cabin is appropriately mounted. It also includes a central boss 64 in which there is a mounting 65 for securing in leak-tight relation with respect to a chamber 66 formed in a plug member 67 the end of the conduit 9 which is remote from the tank 8. The plug 67 is threadedly connected within the central portion of the head 61. The joint between the head 61 and the casing 60 is a gasketed one, as indicated at 69. The casing 60 is provided at a point near its longitudinal center with suitable supporting means, herein shown as a partition 70 having boss portions 71 and a centrally arranged body portion 72 within whose interior certain valve mechanism is arranged. The body portion 72 is traversed by a longitudinally extending bore 73 into which, from the opposite ends thereof, there extend plug members respectively numbered 74 and 74'. Each of the plug members 74 and 74' is traversed at its outer portion with a bore 75 opening into a central chamber 76, and each of the plug members has a smaller opening 77 alined with the bore 75 and opening into a space 78 between the plug members. The space 78 will be observed, in the construction shown, to be bounded peripherally by the wall of an annular groove 79 formed in the body portion 72 and by the end surfaces of the plug members 74 and 74'. Each of the chambers 76 is connected by radial passages 80 with an annular groove formed in the body 72, the annular groove associated with the plug member 74 being designated 81 and the annular groove associated with the plug member 74' being designated 81'. The grooves 81 and 81' are connected by oblique passages 82 and 82' respectively with a bore 83 of a conduit 84, which may be a brass pipe around which the aluminum of the casing is cast; and the conduit 84 extends into communication with the conduit 4 where the latter is mounted in the boss 62. The central space 78 is connected with the bore 85 of a conduit 86 which extends into communication with the conduit 6 where the latter is secured within the boss 63. A valve member 87, comprising a cylindrical body portion 88 movable within the bore 75 in the plug member 74 and a tapered portion 89 adapted to coact with the outer end of the passage 77 in the plug member 74, controls the communication between the bores 83 and 85. The cylindrical portion 88 of the valve 87 is not a close fit for the bore 75, and cabin pressure, which has access to the space surrounding the stem portion of the valve member 87 as later described, enters the left hand chamber 76 in Fig. 4 and flows, when the valve 87 is seated, through the annular groove 81, the passage 82, the bore 83 of the conduit 84, and the conduit 4, into the bellows 44. When the valve 87 is moved to the left and opens communication between the left hand passage 77 and the left hand chamber 76, pressure may be transmitted from the conduit 84 through the passage 82, radial passages 80, left hand chamber 76, left hand passage 77, space 78, conduit 86 and conduit 6 to the exterior of the plane. A valve member 91 is reciprocable, with a slight clearance such as exists around the valve 87, in the right hand passage 75 and is adapted to have its inner end 92 enter and cooperate with the right hand passage 77. This valve is, however, hollow, as shown at 93 and has a relatively small passage 94 opening centrally through its tapered end, with the result that the interior of the valve is adapted to be continuously subjected to external pressure, that is, the pressure outside the cabin, through the right hand passage 77, the chamber 78, conduit 86 and conduit 6. It will be observed that each of the valves 89 and 91 controls the flow of fluid out of the expansible chamber device 43 and provides an immediate control (not a control through one or more other valves) of the pressure therein.

*The control of rate of tank pressure change*

The chamber 66 formed in the plug 67 is adapted to have a highly restricted communication with the interior of the cabin, and further to have continuous communication with each of two mechanisms which will shortly be described, and both of which function to limit the rate of cabin pressure change. Upon the inner end of the plug 67 there is threadedly mounted a cap 97, which holds in position an annular plate 98 against the end of the plug 67. This annular plate 98 is traversed by a small port 99, and an annular scratch 100, Fig. 6, which is coaxial with the plug 67, is formed in the right hand face of the plate 98 in communication with the port 99. A radial groove 101, Figs. 5 and 7, extends outwardly from a conical enlargement 102 of the chamber 66 and intercepts the scratch 100. The radial groove 101 and the restricted port 99 are shown as far apart from each other as possible, and accordingly the rate of flow between the chamber 66 and the space outside the plate 98 will be at a minimum. The inner end of the plug 67 and its supported parts are disposed within a cap member 104 secured in position between the head 61 and a shoulder 105 on the casing 60. The space within the cap member 104 is separated from an annular chamber 107 within the head 61 by a filter and screen arrangement constituted, in view of the extreme fineness of the scratch 100, of a fine mesh screen and of filter paper, this composite dirt excluding device being designated 108. The chamber 107 is in continuous communication with the interior of the airplane cabin as will later be explained. Accordingly, there is at all times a very restricted communication between the interior of the tank 8 and the interior of the cabin, tank pressure lagging behind cabin pressure when cabin pressure is increasing and falling more slowly than cabin pressure when cabin pressure is diminished.

*The control of the valve 87*

For the control of the valve 87 there are provided a plurality of devices. This valve is controllable automatically to maintain approximately constant cabin pressure between predetermined levels, such as 8,000 and 35,000 feet, regardless of the height of the airplane between those limits. The valve is further controlled automatically by means which precludes the diminution of cabin pressure between the moment of take-off and the attainment of cabin pressure conditions which are to be maintained during normal flight (those to be maintained during the range of, say, from 8,000 to 35,000 feet) at a rate in excess of a predetermined maximum, in order that the occupants of the cabin may be saved discomfort. There is further provided for the control of the valve 87 additional means whereby the first mentioned control means may be adjusted at will to effect a predetermined rise in cabin pressure above that normally maintained in the flight zone of 8,000 to 35,000 feet. The operation of this last mentioned mechanism is supplemented by mechanism later to be described which limits the rate of change of cabin pressure which would be effectuated by the operation of this adjustable means.

Referring to Figs. 3 and 10, it will be observed that the casing 60 has, at a point between its left hand end in Fig. 3 and the partition 70, an inwardly projecting portion, herein shown as an annular portion 111, which serves as a mounting means. Clamped to the annular portion 111 is an annular end member 112, and to the left hand face of the end member 112 there is clamped a perforated cylindrical housing member 113. Surrounding this housing member and also held in position by means of the annular flange 111 is a cylindrical screen structure 114 whose right hand end together with the right hand end of the housing member 113 and the end member 112 is held in position by suitable screw devices 115 threadedly engaged as at 116 in the annular rib 111. The housing member 113 at its left hand or rearward end supports a transverse plate 117 and is longitudinally slotted at several points about its periphery for a substantial distance as shown at 118 at its end which supports the plate 117. The plate 117 serves as a mounting for a stop rod 119 which has an enlarged head portion 120 spaced a short distance from its left or rear end. To this head portion there is brazed or otherwise suitably secured the left or rear end of a bellows 121 whose right or forward end is connected to a head member 122 which has a central projection 123 having a bore 124 in which the right or front end of the stop rod 119 is received. The space within the bellows is evacuated. Ordinarily, in view of the evacuated state of the bellows 121, the head 122 engages the stop rod 119, that is to say, unless the cabin pressure is below a predetermined value which corresponds to any desired elevation, as, for example, 8,000 feet mentioned above. The head 122 is slidably guided in a cylindrical bore 125 formed in the head 112 and has a peripheral flange 126 which is engaged by one end of a spring 127 whose other end rests upon a shoulder 128 formed near the rear end of a sleeve 129 which is slidable within the cylindrical member 113. Pins 131 are carried by the left or rear end of the sleeve 129 and project through the longitudinal slots 118 in the member 113 and are received at their outer ends in a helical groove 132 formed in a rotatable adjusting member 133 which is secured to a gear member 134, which is in turn rotatably mounted upon a sleeve 135 surrounding the rearward end of the stop rod 119. By rotating the gear 134 the internally threaded sleeve 133 will be turned on its axis and will cause the pins 131 to move in one direction or the other along the slots 118, thus changing the compression of the spring 127 and altering the point at which reducing cabin pressure will no longer hold the evacuated bellows 121 compressed. Also supported on the sleeve 135 is another and larger gear 136 to which there is secured a pointer 137. A cap member 138 mounted on the left hand end of the casing 60, as the same is shown in Fig. 3, supports an annular cover-glass 139. The cap member 138 supports an annular dial 140 intermediate the cover-glass 139 and the large gear 136, this dial being located inwardly of the pointer 137. The inner rim of the cover-glass 139 is supported by a further cover ring 142 which is clamped against a flange 143 on the sleeve 135 by means of a nut and washer arrangement 144 secured on the threaded extremity 145 of the stop rod 119. In order that the pointer 137 may be turned at the same time that the compression of the spring 127 is adjusted, I have mounted a pair of pinions 147 and 148 for concurrent turning, as shown in Fig. 3ᵃ. The pinion 147 is mounted on a shaft 149 extending through an opening in the cap member 138, and meshes with the gear 134. The pinion 148 is formed on a sleeve-like body 150 surrounding the shaft 149 and meshes with the gear 136. The shaft 149 and the sleeve 150 are secured together as at 152 after the requisite adjustment between the pinions has been made to cause the pointer to mark the desired zero position, herein thirty inches, at the proper degree of compression of the spring 127. It will be noted that by turning the pinions concurrently at equi-angular rates, the pointer will be moved and the sleeve 129 will be adjusted; and the adjustment of the sleeve will change the compression of the spring 127 so that the pointer will indicate the pressure in inches of mercury (with the calibration employed) within the cabin at which the spring 127 will be effective to move the head 122 in a direction to effect closure of the valve 87. It may be noted by an inspection of Fig. 2 that the dial 140 is calibrated in inches of mercury absolute. The reading "30" corresponds to approximately atmospheric pressure at sea level, and it also corresponds to a barometric pressure of 18 inches of mercury in a 360° different pointer position. When the pinions are turned until the pointer 137 is at a position of "22¼" approximately, there will exist such an adjustment of the spring compression that the head 122 will not be moved toward the right in Fig. 3 until the cabin pressure is reduced to a value corresponding to an elevation of 8,000 feet. Referring to Fig. 3, it will be apparent that the compression of the spring 127 is at a minimum, and with the arrangement shown this would correspond to a setting at eighteen inches of mercury (the same position of Fig. 2) and a height of between 13,000 and 14,000 feet. Thus during normal flight at above 8,000 feet the spring will be more compressed than Fig. 3 shows it, and when it is desired to increase cabin pressure the spring 127 will have its compression still further increased.

Before describing the mechanism which operates to control the rate at which the cabin pressure can be reduced during the period immediately following takeoff of the airplane, it may be noted that the interior of the casing 60 is connected with cabin pressure through an opening 154, Fig. 3a; that all of the fluid which is to pass to the right of the end member 112 must pass through the screen 114; that openings 156 are provided in the end member for the establishment of cabin pressure conditions within a chamber 157 between the annular rib 111 and the partition 70; and that in the movable end member 122 there are provided additional openings 158 for the transmission of cabin pressure conditions into a space centrally of the chamber 157.

The stationary head member 112 has secured thereto a pair of coaxially arranged bellows 160, 161, these being suitably brazed or otherwise attached to the head 112. At their other ends they are attached to a movable head member 162, and the space bounded by these bellows and the portions of the head members between their attachments to these members is designated 163. The head member 162 inwardly of the bellows 161 is perforated, as at 164, to permit equalization of pressures at opposite ends of the inner bellows so far as the areas thereof responsive to pressure are concerned. The head 162 is provided with a sleevelike portion 166 to which the valve 87 is connected by a wire connector 167. An adjustable abutment device 168 is supported by the sleeve portion 166 and has a left or rear extremity 169 which is adapted to coact with the movable end member 122 when the evacuated bellows 121 takes over control. When the evacuated bellows is still in its collapsed position, the extremity 169 controls the distance the valve 87 may be moved to the left. The space 163 between the bellows 160 and 161 is connected through a conduit 170 and a passage 171 in the plug element 67 with the chamber 66, so that the pressure conditions within the tank 8 always subsist in the space between the two bellows mentioned. A spring 172 of suitable strength and length is provided to act upon the left hand face of the movable head 162 in Fig. 3, the other end of this spring resting upon an annular shoulder 174 on the body portion 72.

Let us now reexamine the conditions relative to the bellows 160 and 161. The space 163 between these bellows is continuously under the pressure prevailing within the tank 8. The space inside the bellows 161 is under cabin pressure but the oppositely acting areas counterbalance each other. The outside of the bellows 160 and the outside of the head 162 are subject to cabin pressure, and cabin pressure acts on these surfaces to provide a force tending to open the valve 87. The spring 172 exerts a predetermined pressure tending to open the valve 87. When cabin pressure is less than tank pressure, a condition which might exist when the aircraft climbs rapidly, the pressure from the tank within the chamber 163 between the bellows 160 and 161 will tend to close the valve 87. The opposed areas subjected to tank and cabin pressures, and the strength of the spring 172, are so predetermined that whenever tank pressure exceeds cabin pressure by a predetermined amount the valve 87 will close. These areas and pressures are so predetermined as to limit the rate of decrease in cabin pressure while climbing to the pressurizing altitude (about 8,000) to about one inch of mercury per minute (equivalent to 1,000 feet per minute at sea level).

It will now be possible to follow the operation of the pilot mechanism so far described. Let us start with an airplane about to take off. Air is being continuously pumped into its cabin. The pressure within the tank 8 and within the cabin may be presumed to be equal. The valve 87 will be open, connecting the interior of the bellows 44 in communication with atmosphere, and as the cabin pressure will be slightly above atmospheric the valve 17 will also be open. As the airplane rises from the ground the cabin vent valve will be open and cabin pressure will commence to fall. Because of the restricted communication between the tank interior and the interior of the cabin, if the plane rises rapidly the cabin pressure will drop more rapidly than the pressure in the tank. As soon as cabin pressure has fallen a predetermined amount relative to tank pressure the bellows device 160, 161, because the relatively higher tank pressure acting on said bellows exceeds the combined force of cabin pressure and spring 172, will close the valve 87, resulting in cabin pressure passing along the valve 87 entering the vent valve operating bellows 44 and partially closing the vent valve. This will result in an interruption in the fall of cabin pressure or in an actual slight increase in this pressure, and as a result as soon as the tank pressure falls to less than the predetermined amount as above determined above cabin pressure, the valve 87 will again open and there will be, as a result, a further opening of the vent valve from the cabin. This process, instead of occurring in steps, will occur more or less as a continuous operation, and the cabin pressure will drop off steadily at a controlled rate not exceeding one inch of mercury per minute.

When cabin pressure drops to a value corresponding to the pressurizing height (8,000 feet) the spring 127 will move the head 122 to the right, and thereafter control of the cabin pressure will be under the government of the evacuated bellows 121 until the plane: (a) exceeds 35,000 feet (b) passes below 8,000 feet, or (c) there is an adjustment of the tension of the spring 127. Of course if the spring 127 is placed under a higher compression than that designed for 8,000 foot operation of the bellows 121, the head member 122 will be moved to the right to seat the valve 87 at elevations below 8000 feet; and the bellows 121 will then govern the cabin pressure between this lower elevation and 35,000 feet. If the compression of the spring is increased after the aircraft has passed above the elevation at which pressurizing commences, the head member 122 will be held continuously in a position to seat the valve 87 until cabin pressure builds up to a value corresponding to the new setting of the spring 127. This would mean that the valve 87 would be closed continuously for a substantial period, with the result that the cabin vent valve would be closed continuously, and there would be a very rapid and uncomfortable rise of cabin pressure. Nothing in the mechanism associated with the valve 87 would prevent this result, but I have provided in the mechanism which I shall now describe additional means for preventing an excessively rapid rise in cabin pressure.

*The control of the valve 91*

The control mechanism enclosed within the housing or casing 60 in the space to the right of the partition 70 is adapted to operate the valve 91 to cause the performance of two functions: (a) when the plane attains to altitudes in excess of say 35,000 feet, this controlling mechanism is adapted so to govern the operation of the valve 91 that the valve 17 will cause a constant ratio to be maintained between the cabin pressure and the external pressure; and (b) when the spring 127 has had its compression adjusted to raise the cabin pressure, a portion of the control mechanism, which I shall shortly describe, will operate to limit the rate of increase in cabin pressure to a suitable one, for example holding the rate of pressure change to 0.30" of mercury a minute. These controlling devices operate to perform the functions needed through their control of the valve 91 and the resultant control of cabin vent valve 17.

The space to the right in Fig. 3 of the partition 70 may be considered as divided into two compartments 177 and 178, these compartments being partially separated from each other by an annular flange 179, but communicating freely with each other through a series of openings 180, and both compartments being under cabin pressure. The compartment 177 is connected with the chamber 157 by ports 181 in the partition 70 (see Fig. 11). Since the chamber 157, as previously explained, is subjected to cabin pressure, the mutually communicating compartments 177 and 178 will also be under cabin pressure. The compartment 178 is also connected by passages 191 in the head 61 (Fig. 14) with the chamber 107 so that the latter is also subjected to cabin pressure. The flange or internal rib 179 provides a circular, inwardly facing guide surface 182 within which there is slidably mounted a casing element 183. This casing element is closed at one end by a platelike portion 184 and also threadedly receives a cooperating housing member 185, which has a reduced annular portion 186 at its left hand end in Fig. 3 within which there is threadedly secured a member 187, which provides a radially inwardly projecting flange 188, a radially outwardly projecting flange 189 and a cylindrical, axially extending, perforated stop sleeve portion 190. Bellows 192 and 193 are connected at their left hand ends in Fig. 3 respectively to the outer flange 189 and the inner flange 188, and at their right hand ends they are connected to an annular head member 195 to which there is attached a plate 196 having a hollow sleeve 197 secured thereto and extending to the left in Fig. 3 beyond the left hand end of the bellows 193 and supporting the valve 91. As has previously been explained, the valve 91 is hollow, and, accordingly, the space inside the casing 185, except that portion of the interior of the casing which is inside the bellows 193 and the space between the bellows 192 and 193, is subjected constantly to external pressure through the hollow valve 91. The space to the inside of the bellows 193 is subjected to cabin pressure through openings 199 in a flange 200 formed on the plug member 74'. The space enclosed between the bellows 192 and 193 is evacuated. It will be evident that the device so far described will not be effective to unseat the valve 91 from its position of engagement with the wall of the right hand passage 77 until external pressure has fallen to a low value, a value such as might exist at 35,000 feet. After the plane attains, therefore, to such an elevation as 35,000 feet and so long as it remains above it, the position of the valve 91 will shift as the airplane moves higher or lower in such a manner as to maintain a constant ratio between cabin pressure and external pressure. When the plane reaches an elevation of 35,000 feet the excess of cabin pressure over external pressure will cause the bellows 192, 193 to expand, opening the valve 91 and connecting the interior of the bellows 44 with external pressure, thereby causing an opening of the valve 17 to take place and allowing the cabin pressure to fall. Cabin pressure will act on a relatively small area and external pressure on a relatively large area, and the cabin pressure will, therefore, be maintained in the same proportion to the external pressure as the ratio of the area subject to external pressure bears to the area subject to cabin pressure.

The plate 184 has attached thereto a bellows 202 whose other end is attached to a flange 203 on the member 104 previously described. Between a shoulder on the member 104 and the end plate 184 a spring 205 constantly acts. The characteristics of this spring will shortly be explained. The space inside of the bellows 202 is constantly connected through a passageway 207 to the chamber 66 which is in communication with the tank 8. Now it will be observed that an area upon the head 184 and subject to tank pressure is opposed by an equal and oppositely facing area subject to cabin pressure. These areas are larger than the opposed areas subjected to cabin and tank pressure in chamber 157. When cabin pressure and tank pressure are the same, the spring 205 will maintain the casing 183, 185 in a limiting position to the left which will be determined by the engagement of the valve 91 with its seat. A shoulder 209 on the member 187 and an oppositely facing surface on the guide flange 200 will be spaced by a small distance at this time. If cabin pressure is less than tank pressure, the position of the composite housing 183, 185 will not be changed. If, however, cabin pressure is higher than tank pressure by an amount sufficient to enable the overcoming of the spring 205, the entire mechanism disposed within the casing 183, 185 and such casing will be moved bodily to the right in Fig. 3, and the valve 91 will be opened and the operating bellows 44 will be vented to the outside air, and the valve 17 will be moved in an opening direction. As soon as this partial opening movement takes place there will be a decrease in cabin pressure which will enable the spring 205 again to close the valve 91, with a resultant partial reclosing of the cabin vent valve. It will be clear that instead of this operation taking place in a series of pronounced steps, what will occur will be a modification of the adjustment of the cabin vent valve movements so that cabin pressure cannot rise at a rate in excess of the predetermined amount determined by the strength of the spring 205 and desirably about 0.30″ of mercury a minute, notwithstanding the adjustment that may have been made by means of the deliberate adjustment of the compression of spring 127.

When cabin and tank pressures are approximately the same, it will be obvious that the only thing that will cause movement of the valve 91 will be pressure variations within the chamber with which the hollow interior of the valve 91 communicates. Until a predetermined substantially great altitude, perhaps 35,000 feet, is attained, the external pressure acting upon the bellows 192 and 193 will be sufficient to maintain these bellows, in their evacuated condition, in such a position that the head 195 will engage the stop 190 and maintain the valve 91 closed. When, however, the elevation exceeds 35,000 feet, the external pressure will fall sufficiently to allow expansion of the bellows 192, 193 and an opening of the valve 91, with a resultant partial closure of the vent valve 17, and because of the relative areas, which have been previously explained, above the height of 35,000 feet, there will be maintained a predetermined ratio between cabin pressure and external pressure.

*General operation*

In view of the description of the mode of operation of the components of the illustrative embodiment of the invention which has been given, as description of the parts themselves has been set down, an extensive description of the operation of the apparatus as a whole is unnecessary. It will be understood that when cabin pressure exceeds external pressure and the interior of the bellows 44 is connected with the outside of the cabin, the cabin vent valve 17 will tend to stand open. Now, let us suppose the airplane takes off and rises at a rapid rate. From the time it leaves the ground until the time it reaches an elevation of, say, 8,000 feet, if that be the selected height at which the bellows 121 is to function, the cabin pressure will be reduced, not at the rate at which the external pressure is reduced, but at a rate controlled by the operation of the bellows 160, 161 and the spring 172; there being maintained through the control of the position of the valve 87 a limitation on the rate of cabin pressure reduction to about one inch of mercury per minute or, in other terms, to the equivalent to 1000 feet per minute rise starting at sea level. As the bellows 121 will not expand and take control of the valve 87 until the pressure inside the cabin falls to a value equivalent to external pressure at 8,000 feet, this bellows will be delayed in coming into operation more than would be the case if cabin pressure could fall freely, but it will assume control as soon as the cabin pressure gets low enough. Normally between the heights of 8,000 feet and 35,000 feet the cabin interior will be maintained at approximately a uniform pressure equivalent to external pressure at 8,000 feet, after the pressure has dropped off to that value. If flying at elevations above 35,000 feet occurs, the bellows device 192, 193 will come into operation and permit the escape of air from the valve operating bellows 44, and a resultant partial further opening of the vent valve so that the cabin pressure will be diminished at levels above 35,000 feet, and by reason of the mode of operation heretofore described, the cabin pressure will be maintained at a predetermined ratio (exceeding unity) to external pressure. When the airplane descends below 35,000 feet the automatic control device of bellows 121 will again assume control of cabin pressure and will maintain a cabin pressure approximately equivalent to that which prevails outside the cabin at an elevation of 8,000 feet. When the airplane approaches a landing field, the pilot, or the stewardess, may, if desired, change the adjustment of the spring 127 to effect an increase in the cabin pressure to a value materially above that corresponding to 8,000 feet, but the rate of cabin pressure rise will then be controlled and limited by the bellows 202 and the spring 205, which will limit the rise in cabin pressure to approximately three-tenths of an inch of mercury per minute. As the total range of possible adjustment is only 12″ of mercury, it will be evident that a delay of not exceeding forty minutes in the building up of cabin pressure will at maximum be possible.

From the foregoing description it will be apparent that I have provided a very effective cabin pressure control system, of great flexibility, and adapted to provide safety and comfort for pilot and passengers. As its other advantages will be clear from the foregoing description they need not be rehearsed here. It will be understood that in the interest of simplicity I have not shown adjustments of the springs 172 and/or 205, but I may provide adjustable supports for the right hand ends of either or both of these springs—and thus alter the rates of pressure changes—as by supporting them on annular plates threadedly secured to the cylindrical parts which the springs surround, and providing means for rotating the annular plates. No difficulty at all would be involved in providing a gear rotation of the plate associated with the spring 172; and an outer cap threaded over the dome of the head 104 and turned by an internal gear and a pinion rotated from outside the casing would care for the adjustment of the spring 205.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, in a cabin pressure control system, a cabin vent valve, expansible chamber operating means for said vent valve, valves for controlling the operation of said expansible chamber operating means, means operative upon the reduction in cabin pressure to a predetermined value for actuating one of said last mentioned valves for effecting a control of said operating means to maintain substantially uniform cabin pressure conditions through a wide range of altitudes above a predetermined height, means associated with said last mentioned valve and operative to control the latter for limiting the rate of cabin pressure drop until said predetermined value is reached, means associated with said actuating means for adjusting the same in such manner that the controlling valve which it actuates is moved to effect a rise in cabin pressure, and means cooperating with the other of said controlling valves to limit the rate of cabin pressure rise.

2. In combination, in a cabin pressure controlling system, an aircraft cabin vent valve, an expansible chamber device for regulating the position of said vent valve, a tank having a restricted communication with the aircraft cabin, and a plurality of valves for controlling the operation of said expansible chamber device each having an expansible chamber device for controlling its position, each of said last mentioned expansible chamber devices having a chamber in communication with said tank and each having an area subjected to cabin pressure.

3. In combination, in a cabin pressure controlling system, an aircraft cabin vent valve, an expansible chamber device for regulating the position of said vent valve, a tank having a restricted communication with the aircraft cabin, and a plurality of valves for controlling the operation of said expansible chamber device each having an expansible chamber device for controlling its position, each of said last mentioned expansible chamber devices having oppositely acting areas respectively subjected to tank pressure and to cabin pressure, said oppositely acting areas of one of said last mentioned expansible chamber devices being substantially different from those of the other.

4. In combination, in a cabin pressure controlling system, an aircraft cabin vent valve, an expansible chamber device for regulating the position of said vent valve, a tank having a restricted communication with the aircraft cabin, and a plurality of valves for controlling the operation of said expansible chamber device each having an expansible chamber device for controlling its position, each of said last mentioned expansible chamber devices having oppositely acting areas respectively subjected to tank pressure and to cabin pressure, and springs respectively supplementing the action of tank pressure on one of said expansible chamber devices and opposing the action of tank pressure on the other.

5. In combination, in a cabin pressure controlling system, an aircraft cabin vent valve, an expansible chamber device for regulating the position of said vent valve, a tank having a restricted communication with the aircraft cabin, and a pluraltiy of valves for controlling the operation of said expansible chamber device each having an expansible chamber device for controlling its position, each of said last mentioned expansible chamber devices having oppositely acting areas respectively subjected to tank pressure and to cabin pressure, the oppositely acting areas of one of said last mentioned expansible chamber devices being smaller than those of the other, a spring supplementing the action of cabin pressure on said device having the smaller pressure areas, and a spring opposing the action of cabin pressure on the other of said devices.

6. A pressure control system for the passenger compartment of an aircraft, comprising valve means for controlling the pressure in the passenger compartment, pressure responsive means for controlling said valve means, means providing a confined space having a restricted communication with the compartment, and means for controlling the operation of said pressure responsive means including a plurality of valves each having associated with it passage means for delivering cabin pressure to said pressure responsive means and for connecting the latter with the exterior of the aircraft, operating means for one of said valves including a device subjected to opposing forces produced by compartment pressure and by the pressure in said confined space, and operating means for another of said valves including a device subjected to opposing forces produced by compartment pressure and by a lesser pressure of constant value.

7. In combination, in a pressure control system for the passenger compartment of an aircraft, valve means for controlling the pressure in the passenger compartment, a fluid pressure responsive device for controlling said valve means, means forming a passage through which passenger compartment pressure is supplied and vented relative to said pressure responsive device, means providing a confined space having restricted communication with the passenger compartment, a valve associated with said passage for controlling the operation of said pressure responsive means, and operating means for said valve including a device subjected to opposing forces produced by compartment pressure and the pressure in said confined space.

8. In a cabin pressure controlling mechanism, in combination, an element for performing a controlling action, an expansible chamber device for supporting and moving said controlling element, and another expansible chamber device for actuating said controlling element, means forming a confined space having restricted communication with the cabin, one of said expansible chamber devices having an evacuated chamber and the other a chamber connected with said confined space, and each of said devices having a portion thereof subjected to cabin pressure.

9. In a mechanism for controlling the pressure in the cabin of an aircraft, in combination, a valve movable to regulate cabin pressure, operating means for said valve, controlling means for said valve operating means including an expansible chamber device subjected on opposite surfaces to cabin and exterior pressures, means forming a chamber having a restricted communication with the interior of the cabin, means supporting said expansible chamber device for bodily movement, pressure responsive means acting on said expansible chamber device for effecting movement of the latter, and means for subjecting said pressure responsive means to the pressure differential between cabin pressure and the pressure in said chamber.

10. In combination, in a cabin pressure control system, a cabin vent valve, an expansible chamber device regulating the position of said vent valve, a tank having a restricted communication with an aircraft cabin, a valve for controlling the operation of said expansible chamber device acting directly to control the flow of fluid relative thereto, and operating means for said controlling valve including both a device subjected to opposing forces produced by cabin pressure and by tank pressure and having a spring acting to supplement the action of one of said forces and another device subjected to opposing forces produced by cabin pressure and a subatmospheric pressure, and a common element to which each of said last two devices imparts its own motion during at least a portion of such motion and which in turn transmits such motion to said controlling valve.

11. In combination, in a cabin pressure control system, a cabin vent valve, an expansible chamber device regulating the position of said vent valve, a tank having a restricted communication with an aircraft cabin, a valve for controlling the operation of said expansible chamber device acting directly to control the flow of fluid relative thereto, and operating means for said controlling valve including both a device subjected to opposing forces produced by cabin pressure and by tank pressure and having a spring acting to supplement the action of that one of said forces which is produced by cabin pressure and another, alined device subjected to opposing forces produced by cabin pressure and a sub-atmospheric pressure, and an element alined with said last two devices and operatively connected with said controlling valve for imparting the movements of said devices to said controlling valve in a closing direction.

12. In combination, in a cabin pressure controlling system, a valve movable to control cabin pressure, a fluid pressure actuated operating means for said valve, a second valve for controlling said operating means directly controlling flow of fluid pressure relative thereto, means for moving said second mentioned valve including an expansible chamber device acting thereon and operative upon the attainment of a predetermined pressure relationship between cabin and external pressure to move said second valve, a pressure responsive means for moving said expansible chamber device to move said second valve, and means responsive to a pressure differential between cabin pressure and a pressure which is a function of cabin pressure for subjecting said pressure responsive means to an operating pressure upon changes in cabin pressure in excess of a predetermined rate.

13. In combination, in a cabin pressure controlling system, a valve movable to control cabin pressure, fluid pressure actuated operating means for said valve, a second valve for controlling said operating means directly controlling flow of fluid pressure relative thereto, means for moving said second mentioned valve including an expansible chamber device acting on and operative by its own expansive action to move said second valve, means for subjecting said expansible chamber device to cabin and ambient pressures, an expansible chamber device for moving said first mentioned expansible chamber device to move through the latter said second valve, and means for subjecting said second expansible chamber device to an operating pressure when changes in cabin pressure take place in excess of a predetermined rate, including means for continuously subjecting areas on said device to cabin pressure and to a pressure which is a function of cabin pressure.

14. In combination, in a cabin pressure controlling system, a valve movable to control cabin pressure, fluid pressure actuated operating means for said valve, a second valve for controlling said operating means directly controlling flow of fluid pressure relative thereto, means for moving said second mentioned valve including an expansible chamber device acting thereon and subject to cabin and external pressures, pressure responsive means for moving said expansible chamber device to move said second valve, and means for automatically subjecting said pressure responsive means to an operating pressure upon increases in cabin pressure in excess of a predetermined rate including means for subjecting said pressure responsive means continuously to cabin pressure and to a pressure which is a function of cabin pressure.

15. In a mechanism for controlling the air pressure in the cabin of an aircraft, in combination, valve means for controlling flow of fluid relative to the cabin, means including fluid responsive means, a valve for controlling the operation of said fluid responsive means, and means forming an expansible chamber for moving said valve and subjected directly to and controlled automatically by the pressure conditions inside and outside of the cabin for controlling the position of said valve means, and means associated with said fluid responsive means and embodying means for modifying the controlling action of the fluid responsive means on said valve so as to limit the rate of change in cabin pressure including means responsive to changing cabin pressure and to a pressure which is a function of changing cabin pressure for bodily varying the position of said expansible chamber forming means, thereby to vary the movement of said valve means.

16. In a mechanism for controlling the air pressure in the cabin of an aircraft, in combination, valve means for controlling the flow of fluid relative to the cabin, fluid responsive means actuating said valve means, pilot valve mechanism having actuating means acted on by and responsive directly to the pressure conditions inside and outside of the cabin for directly controlling fluid flow with respect to said fluid responsive means, and associated means for modifying the action of said pilot mechanism for varying the movement of said valve means so as to limit the rate of change in cabin pressure independently of such pressure conditions including means for bodily moving said actuating means governed by changing cabin pressure conditions.

17. In combination, in a pressure controlling device, a controlling valve, operating means for said valve including bellows devices each having one end fixed and one end movable and each constructed and arranged to transmit movement of its movable end directly to said valve and each operative to move said valve in a given direction and each subjected to the pressure to be controlled and one being an evacuated bellows, and means for subjecting the other bellows device to a pressure varying with the pressure to be controlled but having its rate of change limited.

18. In a cabin pressure controlling apparatus, in combination, a valve movable to regulate cabin pressure, a pressure responsive device for controlling said valve, and a pilot mechanism for controlling the flow of pressure fluid relative to said pressure responsive device, said pilot mechanism including a single pair of valve members, means responsive to cabin pressure upon a predetermined reduction thereof below normal atmospheric pressure for controlling one of said valve members to maintain cabin pressure substantially constant, means responsive to external pressure and to an opposing pressure for controlling the other of said valve members to prevent the difference between cabin and external pressures exceeding a predetermined value, and an additional pressure responsive means acting on one of said valve members and responsive to cabin pressure and to a pressure which varies with, but, except under predetermined conditions, at a different rate from, cabin pressure, for limiting the rate of cabin pressure change.

19. In a cabin pressure controlling apparatus, in combination, a valve movable to regulate cabin pressure, a pressure responsive device for controlling said valve, and a pilot mechanism for controlling the flow of pressure fluid relative to said pressure responsive device, said pilot mechanism including a single pair of valve members, means responsive to cabin pressure upon a predetermined reduction thereof below normal atmospheric pressure for controlling one of said valve members to maintain cabin pressure substantially constant, means responsive to external pressure and to an opposing pressure for controlling the other of said valve members to prevent the difference between cabin and external pressures exceeding a predetermined value, and an additional pressure responsive means acting on one of said valve members and responsive to cabin pressure and to a pressure which varies with, but, except under predetermined conditions, at a different rate from, cabin pressure during cabin pressure reduction, for limiting the rate of cabin pressure reduction.

20. In a cabin pressure controlling apparatus, in combination, a valve movable to regulate cabin pressure, a pressure responsive device for controlling said valve, and a pilot mechanism for controlling the flow of pressure fluid relative to said pressure responsive device, said pilot mechanism including a single pair of valve members, means responsive to cabin pressure upon a predetermined reduction thereof below normal atmospheric pressure for controlling one of said valve members to maintain cabin pressure substantially constant, means responsive to external pressure and to an opposing pressure for controlling the other of said valve members to prevent the difference between cabin and external pressures exceeding a predetermined value, and an additional pressure responsive means acting on one of said valve members and responsive to cabin pressure and to a pressure which varies with, but, except under predetermined conditions, at a different rate from, cabin pressure during cabin pressure increase, for limiting the rate of cabin pressure increase.

21. In a cabin pressure controlling apparatus, in combination, a valve movable to regulate cabin pressure, a pressure responsive device for controlling said valve, and a pilot mechanism for controlling the flow of pressure fluid relative to said pressure responsive device, said pilot mechanism including a single pair of valve members, means responsive to cabin pressure upon a predetermined reduction thereof below normal atmospheric pressure for controlling one of said valve members to maintain cabin pressure substantially constant, means responsive to external pressure and to an opposing pressure for controlling the other of said valve members to prevent the difference between cabin and external pressures exceeding a predetermined value, and additional pressure responsive means acting on said valve members and responsive to cabin pressure and to a pressure which varies with, but, except under predetermined conditions, at a different rate from, cabin pressure during cabin pressure increases and decreases, for limiting the rate of cabin pressure change both during increase and during decrease.

22. In combination, in a cabin pressure control system, a cabin vent valve, an expansible chamber device regulating the position of said vent valve, a tank having a restricted communication with an aircraft cabin, a valve controlling the operation of said expansible chamber device, and operating means for said controlling valve including a bellows device subjected on its opposite surfaces to cabin pressure and tank pressure and having a portion for exerting a thrust upon expansion of said bellows device, an evacuated bellows subjected on its exterior to cabin pressure, means for mounting said last mentioned bellows with one end thereof stationary, said evacuated bellows also having a portion for exerting a thrust upon expansion of said evacuated bellows, and connections between said bellows device and said bellows and said controlling valve through which each, upon its respective expansion, through the thrust exerting portion thereof, pushes said controlling valve.

23. In a mechanism for controlling the pressure in the cabin of an aircraft, in combination, a valve movable to regulate cabin pressure, operating means for said valve, and controlling means for said valve operating means including an expansible chamber device subjected on opposite surfaces to cabin and exterior pressures for limiting the ratio between such pressures, means forming a chamber having a restricted communication with the interior of the cabin, a second expansible chamber device subjected on opposite surfaces to cabin pressure and to the same pressure as exists in said chamber, means supporting one of said expansible chamber devices for movement, and means for transmitting to said one of said expansible chamber devices movement from the other of said expansible chamber devices.

24. In a mechanism for controlling the pressure in the cabin of an aircraft, in combination, a valve movable to regulate cabin pressure, operating means for said valve, controlling means for said valve operating means including an expansible chamber device responsive to the opposing effects of cabin and exterior pressures on effective areas bearing a ratio to each other equal to the maximum desired ratio between cabin and external pressures, a pilot valve movable by said expansible chamber device, means forming a chamber having a restricted communication with the interior of the cabin, a second expansible chamber device responsive to the opposing effects of cabin and chamber pressures, and means for transmitting the movements of said last mentioned device to the first.

25. In a mechanism for controlling the pressure in the cabin of an aircraft, in combination, a valve movable to regulate cabin pressure, operating means for said valve, controlling means for said valve operating means including an expansible chamber device responsive to the opposing effects of cabin and exterior pressures for limiting the ratio between cabin and external pressures, means forming a chamber having a restricted communication with the interior of the cabin, a second expansible chamber device responsive to the opposing effects of cabin and chamber pressures, means for transmitting the movements of one of said devices to the other to move the latter, and a pilot valve to which said latter device transmits movement.

26. In combination, in a cabin pressure control system, a cabin vent valve, expansible chamber operating means for said vent valve, a plurality of valves controlling the operation of said expansible chamber operating means, absolute pressure responsive means for controlling one of said plurality of valves, pressure responsive means governed by the relation of cabin and ambient pressures to each other for controlling the other of said plurality of valves, and controlling means for each of said plurality of valves individual thereto and governed by cabin pressure and a pressure which is a function of cabin pressure, for limiting the rate of cabin change.

27. In combination, in a cabin pressure controlling system, a cabin vent valve, expansible chamber operating means for said vent valve, a plurality of valves for controlling the operation of said expansible chamber operating means, controlling means for one of said plurality of valves, controlled by the instantaneous difference between cabin pressure and a pressure which varies as a function of cabin pressure variation, for operating the same to limit the rate of cabin pressure increase, and controlling means for another of said plurality of valves, controlled by the instantaneous difference between cabin pressure and a pressure which varies as a function of cabin pressure variation, for operating said latter valve to limit the rate of cabin pressure reduction.

28. In combination, in a cabin pressure controlling system, a cabin vent valve, expansible chamber operating means for said vent valve, a plurality of valves controlling the operation of said expansible chamber operating means, controlling means for one of said plurality of valves, controlled by the excess of cabin pressure over a pressure which varies as a function of cabin pressure variation, for operating the same to impose a predetermined limit on the rate of cabin pressure increase, and controlling means for another of said plurality of valves controlled by the excess, over cabin pressure, of a pressure which varies as a function of cabin pressure variation, for operating said other valve to impose a different predetermined limit on the rate of cabin pressure reduction.

29. In combination, in a control system for the passenger compartment of an aircraft, valve means for controlling the pressure in the passenger compartment, fluid pressure responsive means for operating said valve means, and a plurality of valves controlling the operation of said pressure responsive means, controlling means individual to each of said plurality of valves responsive to predetermined pressure conditions, one responsive to a predetermined compartment pressure and another responsive to a predetermined relation between cabin and exterior pressure, and controlling means for each of said plurality of valves controlled by pressure in the compartment and by a pressure which varies as a function of compartment pressure for limiting the rate of compartment pressure change.

30. In combination, in a cabin pressure control system, a cabin vent valve, expansible chamber operating means for said vent valve, and a plurality of valves controlling the operation of said expansible chamber operating means, controlling means for one of said plurality of valves responsive to a predetermined cabin pressure, controlling means for another of said plurality of valves responsive to a predetermined change of exterior pressure from cabin pressure, and supplemental controlling means for each of said plurality of valves controlled by cabin pressure and by a pressure which varies as a function of cabin pressure for limiting the rate of cabin pressure change.

31. In combination, in a cabin pressure control system, a cabin vent valve, expansible chamber operating means for said vent valve, and a plurality of valves controlling the operation of said expansible chamber operating means, controlling means for one of said plurality of valves responsive to a predetermined cabin pressure, and controlling means for each of said plurality of valves controlled by cabin pressure and by a pressure which varies as a function of cabin pressure, for limiting the rate of cabin pressure change.

32. In combination, in a cabin pressure control system, a cabin vent valve, expansible chamber operating means for said vent valve, and a plurality of valves controlling the operation of said expansible chamber operating means each directly controlling outflow of fluid from said expansible chamber operating means, controlling means for one of said plurality of valves responsive to a predetermined cabin pressure, controlling means for another of said plurality of valves responsive to a predetermined change of exterior pressure from cabin pressure, and additional controlling means for each of said plurality of valves controlled by cabin pressure and by a pressure which varies as a function of cabin pressure for limiting the rate of cabin pressure change.

33. In combination, in a cabin pressure control system, a cabin vent valve, expansible chamber operating means for said vent valve, and a plurality of valves controlling the operation of said expansible chamber operating means each directly controlling the exhaust of fluid from the latter, controlling means for one of said plurality of valves responsive to a predetermined cabin pressure, and controlling means for each of said plurality of valves each controlled by cabin pressure and a pressure which varies as a function of cabin pressure for limiting the rate of cabin pressure change.

34. In a mechanism for controlling the air pressure in the cabin of an aircraft, in combination, valve means for controlling the flow of fluid relative to the cabin, and means for controlling the position of said valve means, said position controlling means including a fluid pressure responsive device, a valve for controlling the operation of said fluid pressure responsive device, a bellows for moving said valve subjected directly to and controlled automatically by the pressure conditions inside and outside of the cabin, and means responsive to cabin pressure and to a pressure varying with the cabin pressure but at a restricted rate, for overriding the control of said fluid pressure responsive device by said bellows, said overriding means including a fluid pressure responsive device distinct from said first fluid pressure responsive device and responsive to cabin pressure and to said pressure varying with cabin pressure and a connection between said second mentioned fluid pressure responsive device and said bellows for transmitting to the latter a bodily movement and thereby effecting movement of said valve.

35. In combination, in a cabin pressure controlling mechanism, a valve movable to control cabin pressure, an evacuated expansible chamber device subjected to cabin pressure and operative on attainment of cabin pressure to a value corresponding to a predetermined altitude to assume control of and move said valve, and another expansible chamber device subjected to cabin pressure and to a pressure varying with cabin pressure but having its rate of variation restricted for controlling said valve and operative to move said valve to maintain the rate of cabin pressure change below a predetermined maximum until the value at which said first mentioned expansible chamber device takes control is reached, said expansible chamber devices each having a fixed end and each having a movable end and each having between its movable end and said valve a direct mechanical connection for transmitting the individual movement of such end to the valve and said first mentioned expansible chamber device arranged to act as an overriding control for said second mentioned expansible chamber device.

36. In combination, in a cabin pressure control mechanism, a cabin vent valve movable to control cabin pressure, controlling means therefor including a servo-motor and a pilot valve controlling the pressure within said servo-motor, an expansible chamber device responsive to cabin pressure and operative on attainment of cabin pressure to a value corresponding to a predetermined altitude to assume control of said pilot valve and to actuate the same to maintain a substantially uniform cabin pressure, another expansible chamber device for controlling said pilot valve for maintaining the rate of cabin pressure change below a predetermined maximum until the value at which said first mentioned expansible chamber device takes control of said pilot valve is reached, said second expansible chamber device responsive to cabin pressure and to a pressure varying with cabin pressure but having its rate of variation restricted, and each of said expansible chamber devices having a wall movable in a predetermined direction upon expansion of such device, an element for receiving such motion of said walls and imparting it to said pilot valve, and separate means for transmitting the motion of each of said walls individually to said element, whereby each of said walls may transmit motion to said pilot valve while the other of said walls is stationary.

WIN W. PAGET.

REFERENCES CITED

The following references are of record in the file of this patent:

UNITED STATES PATENTS

| Number | Name | Date |
|---|---|---|
| 1,819,370 | Hvid | Aug. 18, 1931 |
| 2,117,800 | Harrison et al. | May 17, 1938 |
| 2,194,749 | Gregg | Mar. 26, 1940 |
| 2,208,554 | Price | July 16, 1940 |
| 2,258,054 | Heidbrink | Oct. 7, 1941 |
| 2,289,639 | Fausek et al. | July 14, 1942 |
| 2,307,199 | Cooper | Jan. 5, 1943 |
| 2,342,220 | Price | Feb. 22, 1944 |
| 2,391,197 | Schwien | Dec. 18, 1945 |
| 2,396,116 | Noxon | Mar. 5, 1946 |

FOREIGN PATENTS

| Number | Country | Date |
|---|---|---|
| 514,055 | France | Nov. 8, 1920 |
| 521,823 | Great Britain | May 27, 1940 |
| 679,386 | France | Jan. 9, 1930 |

OTHER REFERENCES

"Pressurized Cabin Control," by Tinker et al., in the January 1941 issue of "Aviation," pages 38, 119, 124.

Certificate of Correction

Patent No. 2,441,592.  May 18, 1948.

WIN W. PAGET

It is hereby certified that errors appear in the printed specification of the above numbered patent requiring correction as follows: Column 1, line 21, for the word "preferred" read *preferable*; column 17, line 23, claim 12, strike out "a" before "fluid"; column 21, line 6, claim 26, after "cabin" insert *pressure*; column 23, line 12, claim 36, for "movabie" read *movable*; and that the said Letters Patent should be read with these corrections therein that the same may conform to the record of the case in the Patent Office.

Signed and sealed this 13th day of July, A. D. 1948.

[SEAL]

THOMAS F. MURPHY,
*Assistant Commissioner of Patents.*